Nov. 29, 1955  H. L. FITCH ET AL  2,725,155
SEMIAUTOMATIC READYMOUNT MACHINE
Filed July 19, 1951  10 Sheets-Sheet 1
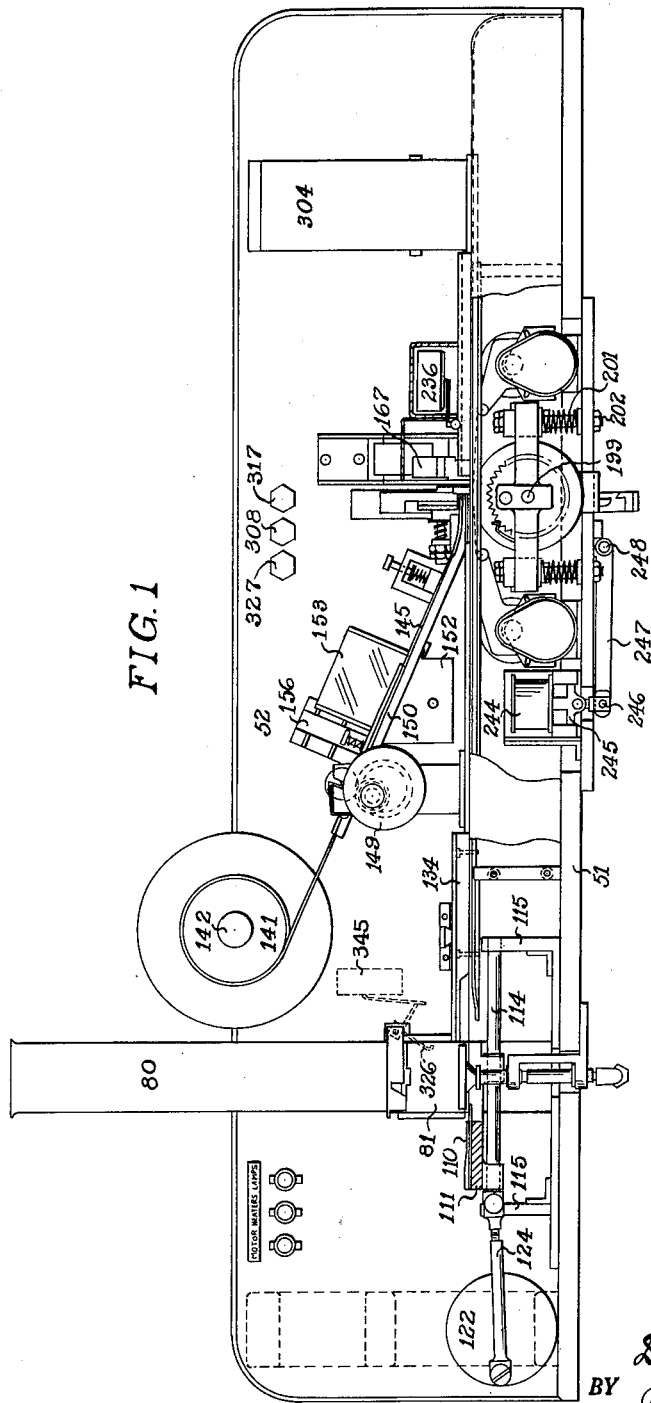
HAROLD L. FITCH
STANLEY L SCUDDER
INVENTOR.
BY
ATTORNEYS

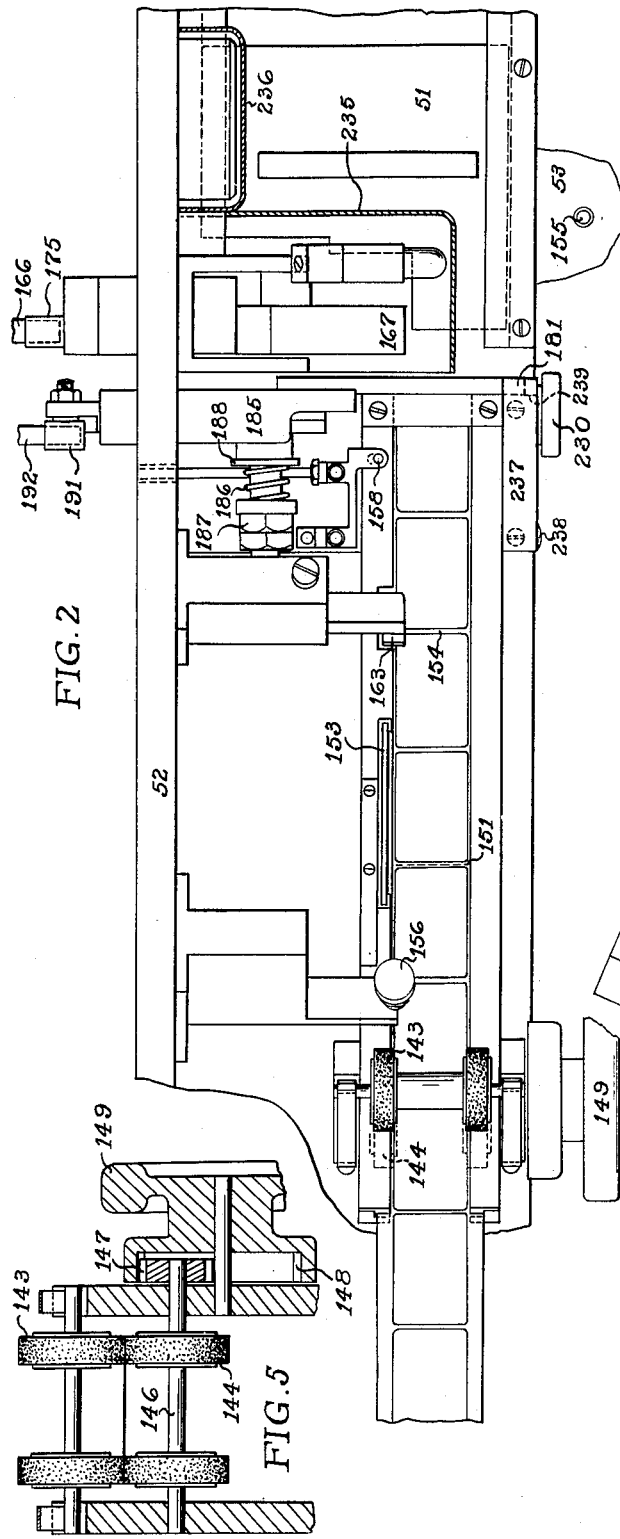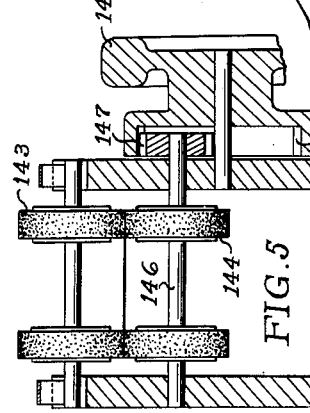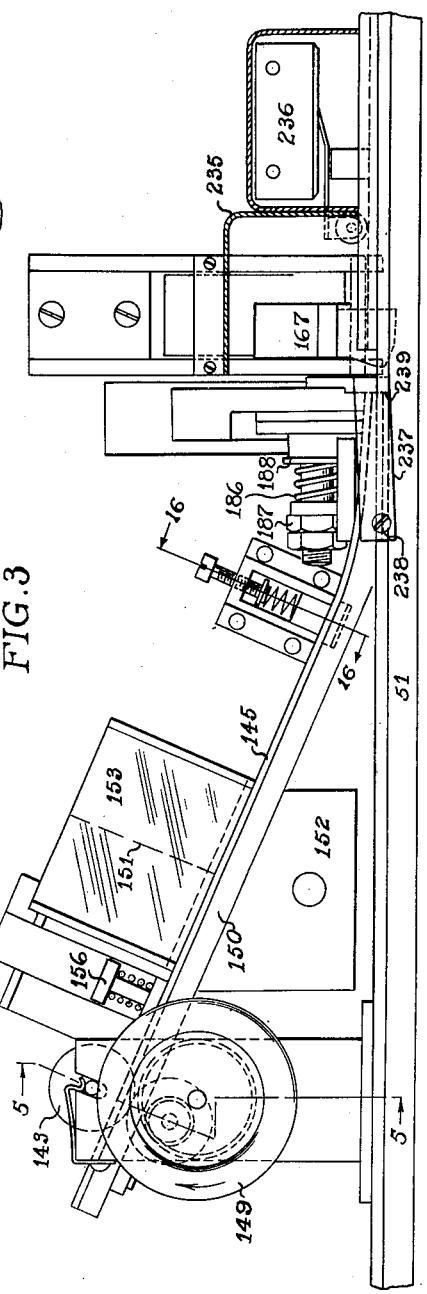

Nov. 29, 1955    H. L. FITCH ET AL    2,725,155
SEMIAUTOMATIC READYMOUNT MACHINE
Filed July 19, 1951    10 Sheets-Sheet 3
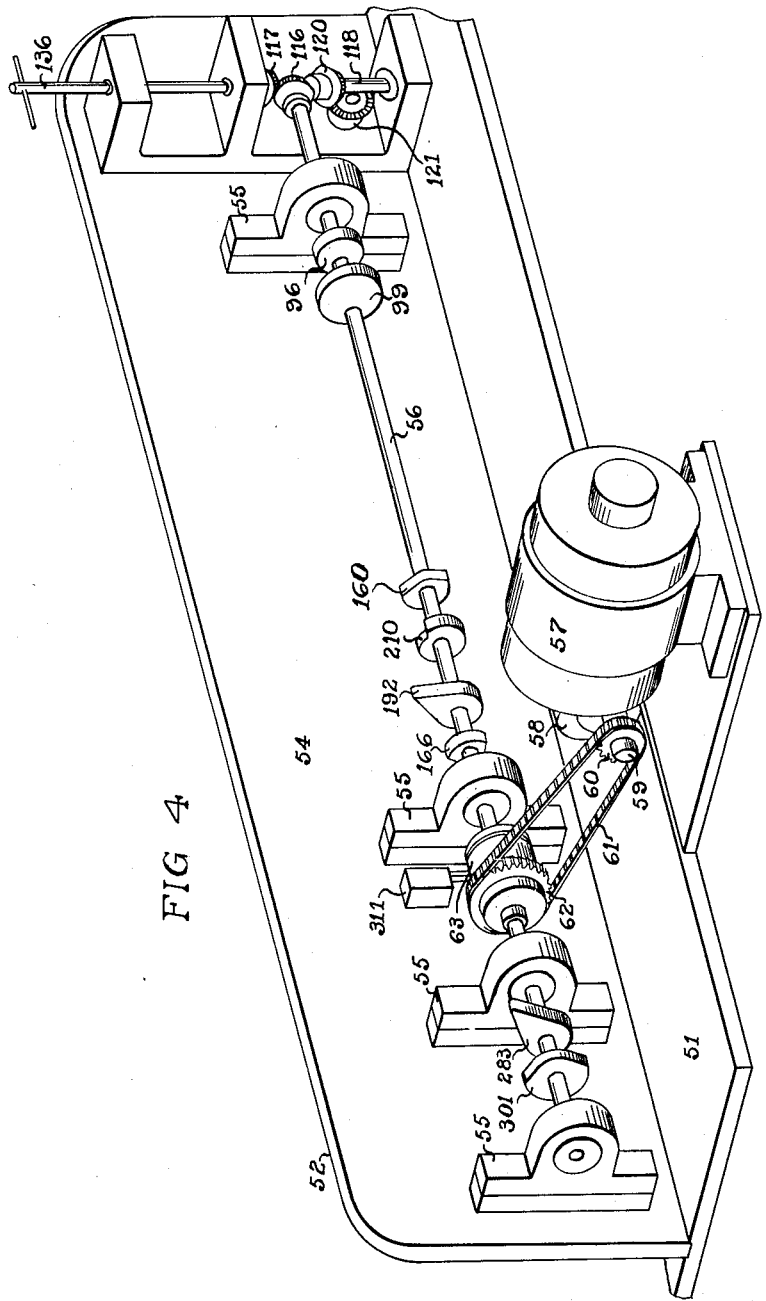
HAROLD L. FITCH
STANLEY L. SCUDDER
INVENTOR.
BY
ATTORNEYS

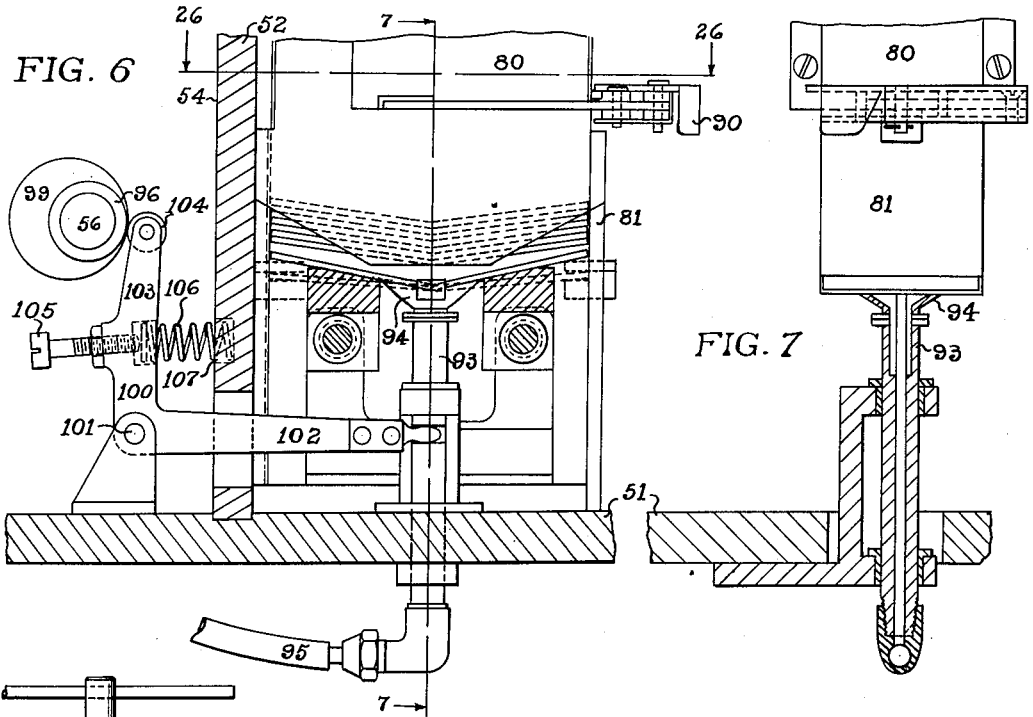
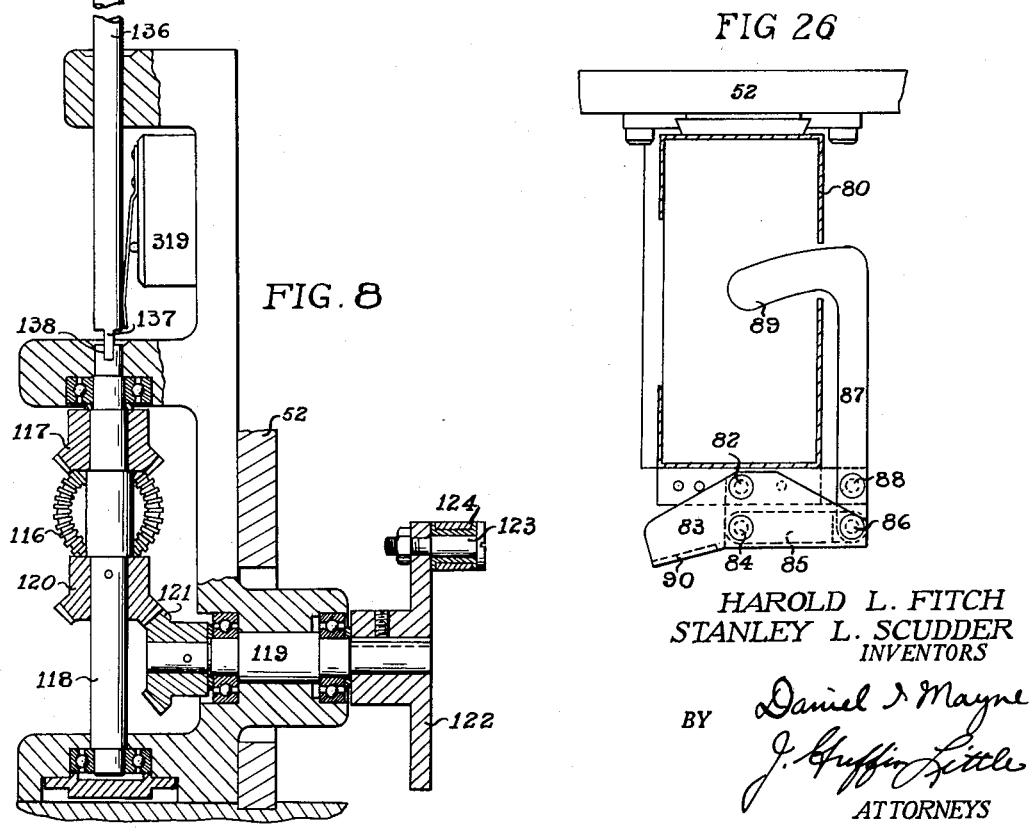

Nov. 29, 1955 H. L. FITCH ET AL 2,725,155
SEMIAUTOMATIC READYMOUNT MACHINE
Filed July 19, 1951 10 Sheets-Sheet 5
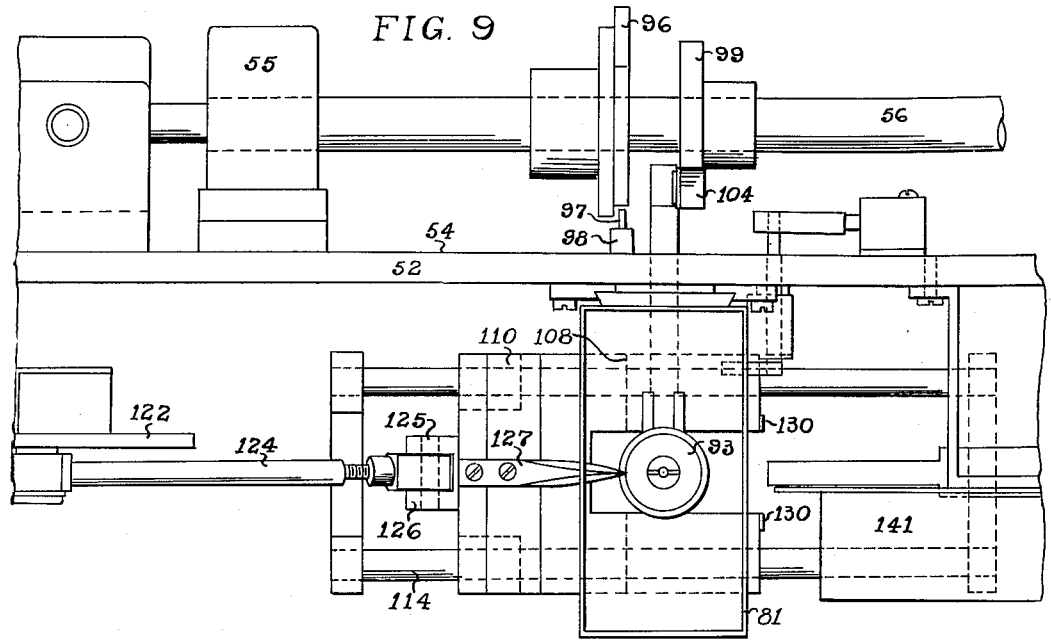
HAROLD L. FITCH
STANLEY L. SCUDDER
INVENTOR.
BY Daniel J. Mayne
J. Griffin Little
ATTORNEYS

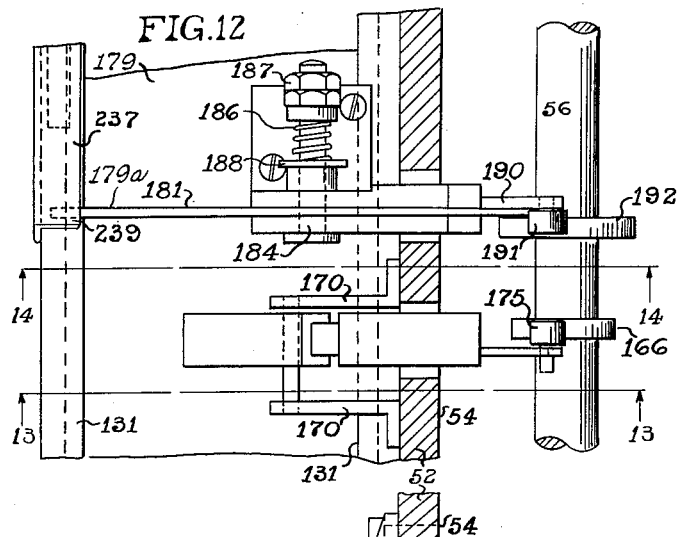
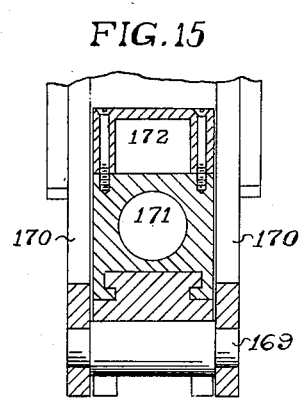
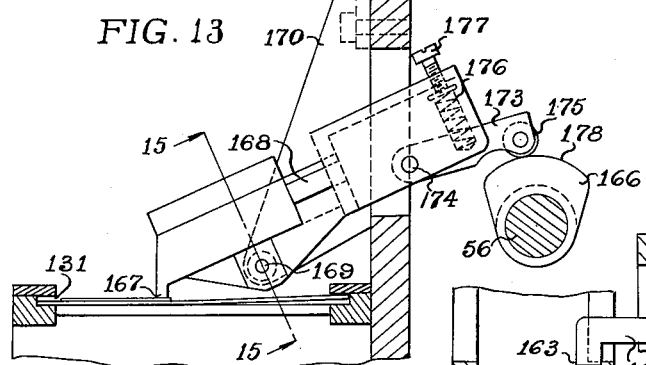
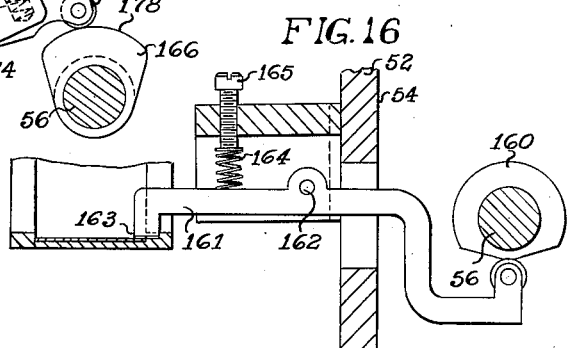
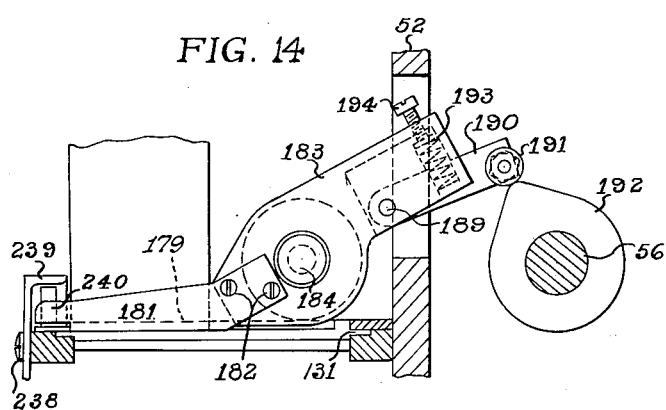

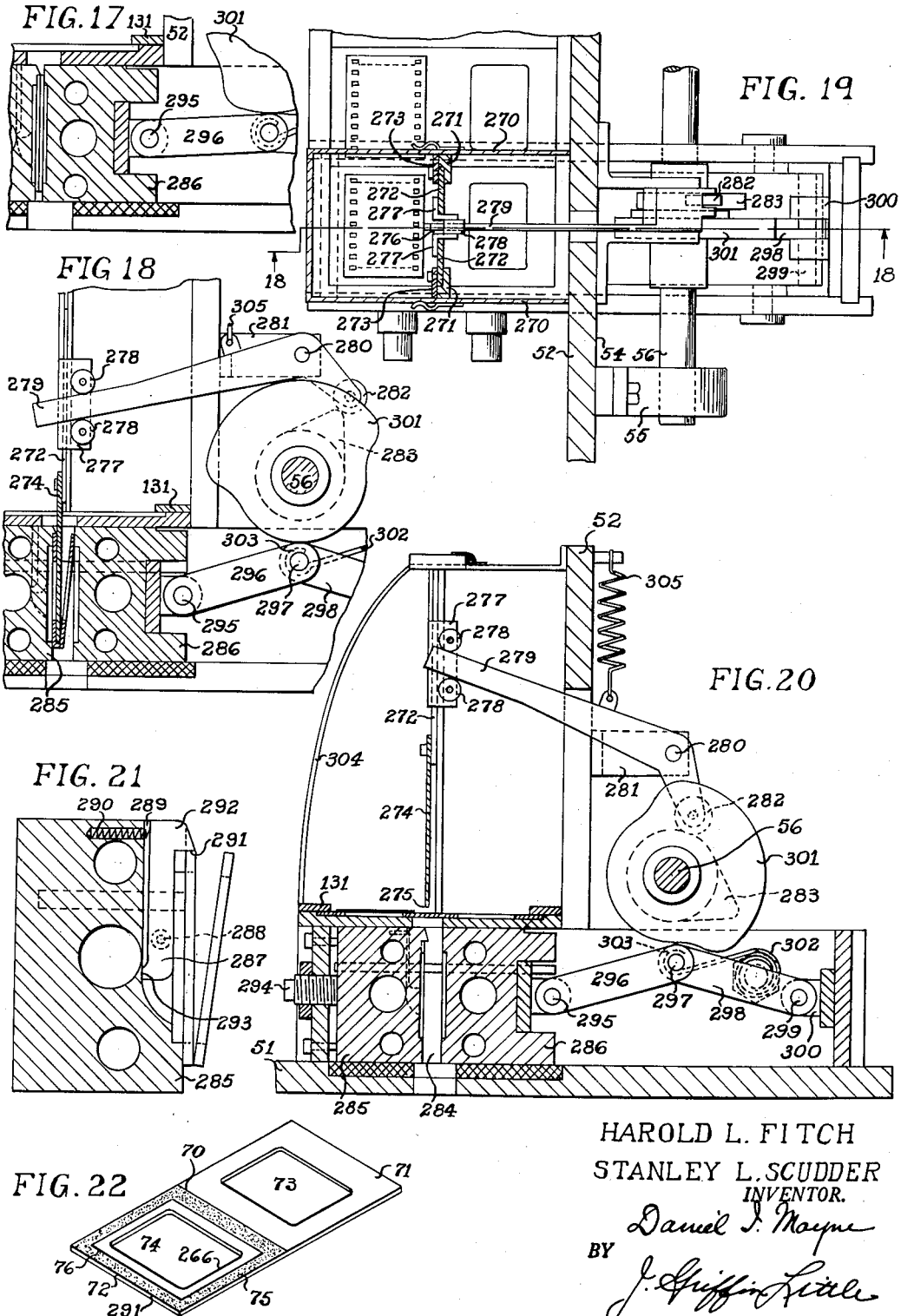

Nov. 29, 1955 H. L. FITCH ET AL 2,725,155
SEMIAUTOMATIC READYMOUNT MACHINE
Filed July 19, 1951 10 Sheets-Sheet 8

HAROLD L. FITCH
STANLEY L. SCUDDER
INVENTOR.

BY Daniel J. Mayne,
J. Griffin Little
ATTORNEYS

Nov. 29, 1955    H. L. FITCH ET AL    2,725,155
SEMIAUTOMATIC READYMOUNT MACHINE

Filed July 19, 1951    10 Sheets—Sheet 9

HAROLD L FITCH
STANLEY L SCUDDER
INVENTOR.

BY Daniel J. Mayne,
J. Griffin Little
ATTORNEYS

Nov. 29, 1955    H. L. FITCH ET AL    2,725,155
SEMIAUTOMATIC READYMOUNT MACHINE
Filed July 19, 1951    10 Sheets-Sheet 10

HAROLD L. FITCH
STANLEY L. SCUDDER
INVENTOR.
BY
ATTORNEYS

2,725,155
Patented Nov. 29, 1955

UNITED STATES PATENT OFFICE 2,725,155

SEMI-AUTOMATIC READYMOUNT MACHINE

Harold L. Fitch and Stanley L. Scudder, Rochester, N. Y., assignors to Eastman Kodak Company, Rochester, N. Y., a corporation of New Jersey Application July 19, 1951, Serial No. 237,528

25 Claims. (Cl. 216—1)

The present invention relates to a film mounting apparatus, and more particularly to a machine for severing a transparency from a web or roll of film, and positioning and mounting the severed transparency in a paper mount and folding and sealing the latter.

As is well known, such transparencies are usually made by successively exposing a film strip in a camera. After the last exposure is made, the exposed strip is rewound back into a light-tight cassette, then removed from the camera and forwarded for processing. To facilitate processing, a plurality of exposed strips are connected in end to end relation to form a long film web which is then wound up into a roll, as shown in Fig. 1 and later described. After processing, the separate transparencies are severed successively from the roll, and each transparency is then individually positioned in a mount which is usually in the form of a sheet of cardboard, or similar material, which is scored along a mid-line to form a pair of flaps having apertures which are adapted to be arranged in registry when the flaps are in overlying relation so as to frame the image area of the transparency. At least one of the flaps is adhesively coated so that when the molded mount is placed between a pair of heated clamping jaws, the flaps are connected adhesively with the transparency sandwiched therebetween and in registry with the apertures, all of which is well known to those in the art.

Prior to the present invention, the various steps of severing and positioning the transparency in the mount, folding and placing the folded mount between the heated clamping jaws were all performed manually. Such a procedure was not only costly but was also otherwise undesirable. In order to overcome these disadvantages the present invention provides a machine in which all the various steps are performed automatically so that the operator need not touch either the film or the mount. Such a machine not only materially reduces the cost of mounting, but, in addition, insures a beter finished product as will be apparent to those in the art.

The machine may be described briefly as follows:

The mounts, in unfolded form, as shown in Fig. 22, are arranged in stacked relation in a magazine 80, see Fig. 1. A reciprocating ejecting mechanism serves to remove the flat mounts individually from the magazine. The ejected mounts, still in flat form, are then moved successively along tracks by the ejecting mechanism to a point adjacent a severing means where the film joins the mount. The film, on the other hand, is fed from a roll along an inclined guide, the lower end of which is positioned adjacent the tracks. The film, during its movement along the inclined guide, is positioned so that a stationary hairline on the guide registers with a frame line on the film strip to position the strip relative to the mounts on the tracks. When the film is thus positioned on the guide, the operator presses a button which actuates a notching mechanism which places a notch in an edge of the film opposite one of the film areas. As the notched film is moved along the guide, it is finally moved into registry with a spring-pressed finger which drops automatically into the notch. The dropping of the finger into a notch initiates a cycle of operation. At this time, the leading image area on the film web has been moved into position over a mount which has been moved beneath the lower end of the guide. The dropping of the finger into the notch closes a circuit to a control relay which releases a one-revolution clutch to connect a constantly driven motor to a main drive or control shaft to operate the latter. As the shaft is rotated, a cam thereon actuates a brake which engages the film web on the guide to prevent further movement of the film therealong. A second cam on the shaft controls the ejecting mechanism which ejects a mount from the magazine. A third cam on the shaft operates a tacking member which engages the transparency on the mount to tack or secure a small portion of the transparency to the mount. A fourth cam on the shaft then operates a knife to sever the positioned and tacked transparency from the film web. The severed transparency is thus positioned and attached to its mount which then moves along the tracks. As one transparency is being tacked and secured, a previously mounted transparency and its mount has reached a folding mechanism which folds the mount, and then moves the folded mount between a pair of heated clamping jaws which serve to seal the mount, the folding and sealing mechanism being controlled by cams on the shaft. Thus the entering of the finger into the notch in the side of the film web positioned on the guide initiates a cycle which ejects a mount from the magazine, tacks a transparency on a mount, severs the transparency from the web, and finally folds and seals the mount. After the mount is sealed, the sealing jaws are opened, and the completed mount drops into a suitable receptacle on a conveyor positioned beneath the clamping jaws.

The present invention has, therefore, as its principal object, the provision of a machine for mounting transparencies automatically.

Another object of the invention is the provision of a transparency mounting machine in which the movement of the film strip initiates the cycle of operation so as to insure proper cooperation of the various parts of the machine.

Still another object of the invention is the provision of a novel type of mount magazine which is provided with a displaceable member for holding the mounts in position therein when the magazine is detached from the machine. However, when the magazine is in operative position the members are moved to an inoperative position.

Yet another object of the invention is the provision of a mounting machine in which the mounts are fed successively from the magazine, the transparency severed, positioned and secured in place on the mount without being touched by the operator, and the mount finally folded and sealed.

And another object of the invention is the provision of a machine of the type described which is relatively simple in structure, rugged, automatic, easy to operate and highly effective in its results.

To these and other ends the invention resides in certain improvements and combinations of parts all as will be hereinafter more fully described, the novel features being pointed out in the claims at the end of the specification.

In the drawings:

Fig. 1 is a front elevation view of an automatic transparency mounting machine constructed in accordance with the present invention;

Fig. 2 is a partial plan view of the middle portion of the machine illustrated in Fig. 1 showing the relation of the parts;

Fig. 3 is a partial front elevation view of the machine illustrated in Fig. 1 but on a larger scale than the latter, showing in more detail the film notching, braking, severing and tacking mechanisms.

Fig. 4 is a rear perspective view of the machine showing the driving motor, the main drive shaft, the one revolution clutch, and the various control cams;

Fig. 5 is a vertical sectional view taken substantially on line 5—5 of Fig. 3, showing wheels for moving the film strip downward along the inclined guide;

Fig. 6 is a transverse sectional view through the mount magazine, showing the relation thereto of the mount separating and ejecting mechanisms;

Fig. 7 is a vertical sectional view taken through the mechanism illustrated in Fig. 6 and substantially on line 7—7 thereof, showing the position of the suction separating means to the magazine;

Fig. 8 is a vertical sectional view through the crank plate for the mount ejecting mechanism, showing the relation thereto of the manual control means;

Fig. 9 is a plan view of the left end of the machine illustrated in Fig. 1, but on a larger scale than the latter, showing the relation of the mount magazine and the mount ejecting mechanism and the controls therefor;

Fig. 10 is a side elevation view, with parts in section, of the mechanism illustrated in Fig. 9, showing the magazine and the mount guide tracks along which the mounts are moved after being ejected from the magazine.

Fig. 11 is an end view of the mount ejecting mechanism, showing the relation of the parts;

Fig. 12 is a partial plan view of the middle part of the machine, showing the knife and tacking member and the control cam therefor;

Fig. 13 is a vertical sectional view taken substantially on line 13—13, Fig. 12, showing the relation of the tacker to the transparency and the mount, and the tacker control cam;

Fig. 14 is a vertical sectional view taken substantially on line 14—14, Fig. 12, showing the severing knife and its control cam and associated parts;

Fig. 15 is a vertical sectional view through the tacker and taken substantially on line 15—15 of Fig. 13, showing the relation of the heating means and the control thermostat for the tacker;

Fig. 16 is a vertical sectional view through the brake arm for holding the film strip against movement on the inclined guide, and the contral cam therefor, taken substantially on line 16—16 of Fig. 3.

Fig. 17 is a vertical sectional view through the heating jaws which seal the mount, showing the relation of the mechanism for moving the movable jaws, the jaws being in closed position;

Fig. 18 is a view similar to Fig. 17, showing additional details of the control cams for actuating the folding mechanism which is positioned above the sealing jaws and taken substantially on line 18—18 of Fig. 19, the jaws being in open position;

Fig. 19 is a plan view of the folding mechanism with the folding blade in section, showing the relation of the blade to the sealing jaws and the controls, the mount being in the unfolded condition;

Fig. 20 is a view similar to Fig. 18, but showing the mounting of the arm for moving the movable jaws, the jaws being in open position;

Fig. 21 is a vertical sectional view through the stationary clamping jaw, showing the relation thereto of the mount retaining member;

Fig. 22 is a perspective view of a mount on which the transparency is to be positioned, the mount being in the open or unfolded position in which it is arranged when ejected from the magazine and fed along the tracks to the folding mechanism;

Fig. 26 is a horizontal sectional view of the mount magazine taken substantially on line 26—26 of Fig. 6, showing the relation thereto of the holding finger;

Similar reference numerals throughout the various views indicate the same parts.

Figure 23:
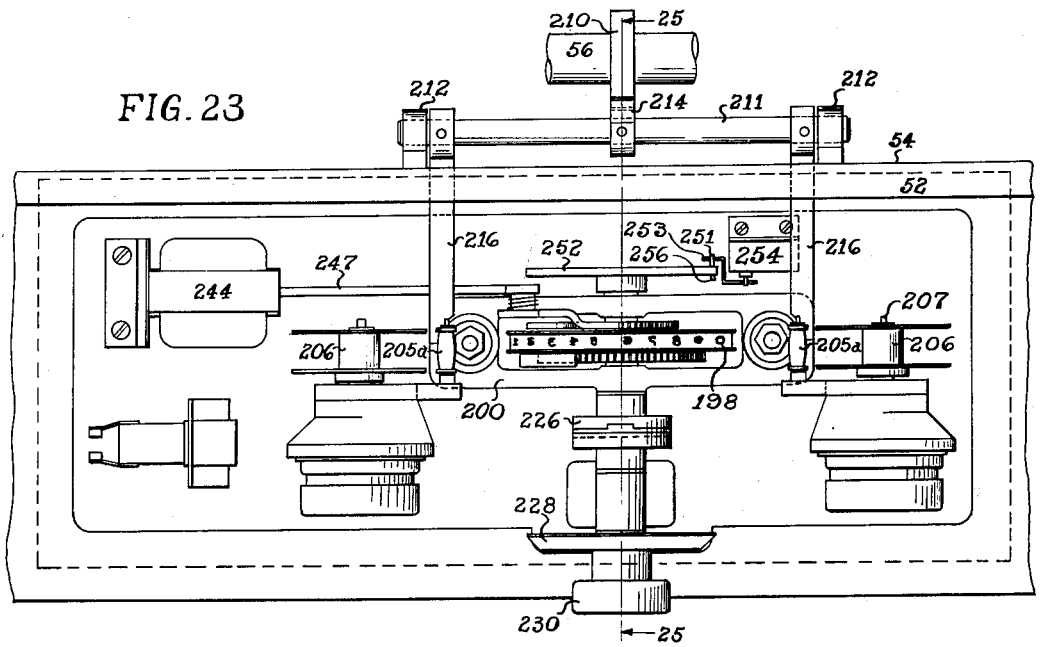
Fig. 23 is a plan view of the mount numbering mechanism.

The machine comprises a T-shaped base having a horizontal base plate 51 and a vertical backing plate 52 extending upward from the base plate as best shown in Fig. 4. This base plate 51 may be carried by any suitable support, such as a table top, a portion of which is shown at 53, Fig. 2. The rear face 54 of the plate 52 has positioned thereon a plurality of aligned bearings 55 which support the main drive or control shaft 56 on which the various control cams, to be later described, are mounted. An electric motor 57 is connected through a gear box 58 to a shaft 59 on which is mounted a sprocket 60 connected by a chain 61 to a sprocket 62 connected to a one-revolution cluch 63 carried by shaft 56. As this one-revolution clutch may be of any standard or well known design, and does not, per se, form a part of the present invention, details thereof are not shown or described. Suffice it to say, that when the clutch 63 is restrained, by means to be later described, the sprocket 62 is not connected to the shaft 56 and the latter is not rotated. However, when the clutch 63 is released, it will connect sprocket 62 to shaft 56 to impart one revolution to the latter, whereupon the clutch is again restrained automatically to disconnect sprocket 62 from shaft 56, and the latter stops. The reason for such an arrangement will be later described. The important feature is that the shaft 56 is intermittently rotated one revolution only each time the clutch is released so as to actuate the various control cams in proper sequence.

The mount in which the transparency is to be positioned may be of the type shown in Fig. 22. Such a mount may be formed from a single sheet or blank of stiff material, such as paper, cardboard or similar substance, which is scored along a mid-line 70 to provide a pair of frame members or flaps 71 and 72 formed with apertures 73 and 74 respectively. A hollow, rectangular frame member 75, preferably in the form of a sheet of dry mounting tissue, is placed on the flap 72 in the position shown in Fig. 22. This frame member is substantially the same size as flap 72 and has one side secured thereto and is formed with a central opening 76 of such size as to receive the transparency loosely therein, as is well known in the art. When the transparency is in position in the opening 76, the image area thereof will be framed by aperture 74, as is deemed apparent. Both sides of frame 75 are adhesively coated so it will adhere only to flap 72 when the flaps are in open position; but, when the flap 71 is folded to overlie flap 72, the adhesive coating on frame 75 also will adhere to flap 71 to connect the two flaps adhesively to seal the mount and to retain the transparency in position therein. The particular form of mount does not constitute a part of the present invention and may be of the type shown and described in the patent to Staehle 2,184,007, issued December 19, 1939. While this particular form of mount is shown and illustrated, it is not intended as a limitation but merely to indicate one form of mount suitable for use in the machine of the present invention.

The mounts, in their open or unfolded position shown in Fig. 22, are arranged in stacked relation in a tubular magazine 80. This magazine is positioned on a hollow frame member 81 extending upwardly from the base plate 51 and positioned adjacent a separating and ejecting mechanism to be presently described. Usually a weight, not shown, is positioned in the top of the stack of mounts in the magazine to insure proper feeding of the mounts to the separating and ejecting mechanisms. It is some times desirable or necessary to remove the magazine when partly filled with mounts. Obviously, when such removal is performed, it is desirable to provide means to support the mounts remaining in the magazine to prevent spilling of the mounts, the disadvantage of which is deemed apparent. To this end the side of the magazine 80 towards the operator has pivoted thereon at 82, adjacent the bottom of the magazine, a plate 83. The latter, in turn, has pivoted thereon at 84 one end of a link 85 the other end of which is pivoted at 86 to one end of a rocker arm 87 pivoted intermediate its ends at 88 on the magazine, all of which is best shown in Fig. 26. The free end of the arm 87 is formed with a finger 89 which may be positioned within the magazine 80 and under the stack of mounts therein as is deemed apparent from an inspection of Fig. 26. When the loaded magazine is to be removed the plate 83 may be engaged adjacent pivot 86 and moved upward, as viewed in Fig. 26. Such movement will impart a counterclockwise movement to plate 83 and push link 85 to the right to rock arm 87 in a counterclockwise direction to move finger 89 into the magazine as shown in Fig. 26. In this position the finger 89 will serve to support the mounts above the finger when the magazine is removed. However, when the magazine is replaced, a fingerpiece 90 on plate 83 may be pushed upward, as viewed in Fig. 26, to impart a clockwise movement to plate 83. Such movement, through link 85, will serve to rock arm 87 clockwise to withdraw finger 89 out of the magazine and out of holding relation with the mounts therein.

When the filled magazine is in position, the mounts may be ejected therefrom by separating and ejecting the bottom mount in the stack. In such a method of ejecting, it is possible that the lowermost or bottom mount may catch or jam on the next adjacent mount and prevent or interfere with the proper ejection, the disadvantages of which are deemed apparent. In order to eliminate any such possibility, the present invention provides means for first separating the bottom mount from the stack, and then ejecting the separated mount. To this end, suction is applied to the bottom mount in the magazine to separate this mount from the stack, as best shown in Fig. 6. To secure this result, a reciprocally mounted hollow suction plunger 93 is positioned below and substantially on the axis of the magazine, as shown in Figs. 6, 7, and 9. This plunger has the upper end formed with a flare or bell mouth 94, while the lower end is connected by a hose 95 to any suitable source of suction, not shown. In order that the operation of the suction separating means will be in proper timed relation with the other parts of the machine, the operation of the suction means is controlled from the main drive shaft 56. It will be remembered that when the finger, to be more fully described, drops into the notch formed in the side of the film, the one revolution clutch is released and the shaft 56 makes one revolution.

During the initial part of said revolution, a cam 96 on shaft 56 engages and moves stem 97 of the valve 98, see Fig. 9, connected in the suction line to hose 95 to apply suction to the plunger 93. The latter is at that time in its upper position with the mouth 94 in contact with the lowermost mount in the stack. The result is that, by reason of the suction in plunger 93, the lower mount is drawn down against mouth 94, to separate the lower mount partially. However, to insure complete separation, the plunger 93 also is moved downwardly, and thus moves the lower mount therewith to insure the complete separation of the lower mount from the stack of mounts. In order to move the plunger, the shaft 56 is provided with a second cam 99 positioned adjacent cam 96. A bellcrank lever 100 is pivoted on plate 51 at 101, and has one arm 102 connected to plunger 93, see Fig. 6, while the other arm 103 carries a roller 104 which engages cam 99. It will be apparent from an inspection of Fig. 6 that when the shaft 56 is rotated clockwise, the cam 99 will rock the bellcrank similarly to move plunger 93 and its attached lowermost mount downward to separate this lowermost mount from the stack. In order to allow for tolerances of the parts and provide a cushion, arm 103 of the bellcrank is provided with an adjusting screw 105 the inner end of which engages one end of a spring 106 having one end thereof recessed in arm 103, while the other end of the spring is positioned in a recess 107 in the rear face 54 of plate 52, all as shown in Fig. 6.

As the lowermost mount is pulled down and separated by plunger 93, the mount is bent out of a plane, as is apparent from an inspection of Fig. 6. As the plunger moves the separated and bent mount downward, the mount finally engages the inclined upper surface 110 of an inverted U-shaped reciprocating ejector generally indicated at 111 and of the shape best shown in Fig. 11. This ejector is slidable under the magazine 80 and serves to move or eject the separated mount out of the magazine. In addition, as each mount is ejected, it serves to move the group of previously ejected mounts along tracks, to be later described. The ejector is formed with a pair of depending legs 112 having openings 113 adapted to receive slidably a pair of rods 114 supported on spaced brackets 115 carried by the base plate 51. The ejector is driven from shaft 56. To secure this result, the right end of the shaft 56, as viewed in Fig. 4, carries a gear 116 which meshes with a gear 117 mounted on a vertical shaft 118. The latter, in turn, drives a lower horizontal shaft 119, see Figs. 4 and 8, through bevel gears 120 and 121. The right or front end of shaft 119, as viewed in Fig. 8, has mounted thereon a crank plate 122 to which is eccentrically connected at 123 one end, the left end as viewed in Fig. 1, of a connecting rod 124, the other end of which is connected rockably at 125 to a crosshead 126 formed on ejector 111, as best shown in Figs. 1, 9 and 10.

Figure 29:
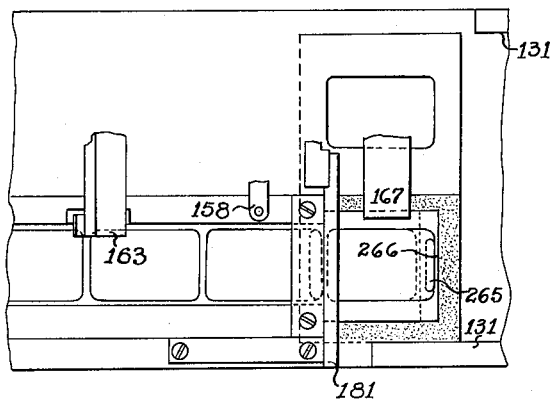
Fig. 29 is a plan view of the photoelectric cell control means and the exciter lamp therefor for controlling the positioning of the transparency on the mount.

Thus, the ejector 111 is connected to and driven directly by shaft 56, so that each time the latter makes one full revolution a complete reciprocation is imparted to ejector 111 to shift the lowermost separated mount out of the magazine 80, and move the preceding mounts along the tracks. To further insure proper ejection, the ejector surface 110 is provided with a tapered finger 127 which, when the ejector moves forward, or to the right, as viewed in Figs. 9 and 10, passes between the separated mount and the stack to insure complete separation of the lowermost mount. As the ejector moves forward, a shoulder 108 thereon engages the trailing edge of the separated mount to move the latter to the right, as viewed in Figs. 1, 9 and 10, and out of registry with the magazine. As the separated mount moves out of the magazine it rides under a spring pressed finger 128 which tends to depress the mount. Then when the ejector returns to the left, the spring finger 128 moves the mount downward to the position shown at 129, Fig. 10, in which the trailing edge of the mount engages under a lip 130 formed on the leading edge of the ejector, and the leading edge of the mount contacts the trailing edge of the preceding mount so that all the mounts are in contact. In this position, the ejected mount engages a pair of spaced tracks 131, the left ends 132 of which are depressed, as shown in Figs. 1 and 10, to permit the downward movement of the mount when the ejector returns, as mentioned above. Then, on the next forward movement of the ejector, the leading edge 133 of the ejector serves to move all the mounts to the right along the tracks 131, as viewed in Figs. 1 and 10. A safety guard 134 is positioned over the left end of the tracks 131, see Figs. 1 and 10. This guard is connected into the electric circuit of the motor 57, as shown in Fig. 29, and later explained, so that if it is necessary to lift the guard to get at the mounts on the tracks, the machine will be shut down automatically, the advantages of which are deemed apparent.

As mentioned above, the crank plate 122 is driven from shaft 56. However, in the event of jamming of the mounts on the tracks, or for any other reason, it may be desirable to operate the ejector manually for a short period. To secure this result, a handle member 136, Fig. 8, has the lower end formed with a blade section 137 which is receivable in a socket 138 formed in the upper end of shaft 118, so that the latter, and hence the ejector, may be actuated manually. This arrangement permits the entire control mechanism to be moved forward or backward. This is a distinct advantage because such backward movement is not possible with the motor drive. After the trouble is eliminated, the handle 113 is detached and the mechanism may now be driven by the motor. When the handle is in position it engages a microswitch 319, as shown in Fig. 8, which cuts out the circuit of the motor. This switch will be described in connection with the wiring diagram. Suffice it to say, when the handle 136 is in place, the ejector mechanism may be operated manually and the drive motor is cut out. However, when the handle is removed, the motor is automatically cut back into operation.

Figure 27:
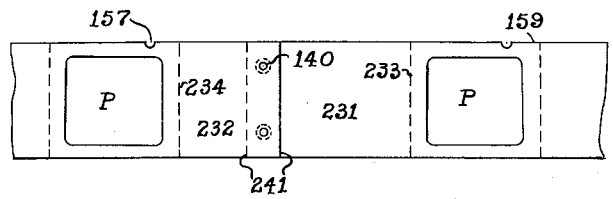
Fig. 27 is a section of the film web, showing the manner of connecting or splicing individual film strips in end to end relation.

As the mounts are moved along the tracks 131, each mount successively reaches a point at which it receives a transparency. As mentioned above, the very short strips of film are connected together to form a long web. In the present instance, the adjacent ends of the individual strips are overlapped and the overlapped ends are connected or spliced by means of a pair of eyelets 140, as shown in Fig. 27. The spliced strips are then wound into a roll 141, which is positioned on a spindle 142 carried by the back plate 52, as best shown in Fig. 1. The web of film is unwound from the roll 141 and is passed between pairs of rollers 143 and 144, see Fig. 5, positioned near the upper end of an inclined guide 145. The shaft 146 for the lower rollers 144 carries a gear 147 which meshes with an internal gear 148 carried by an operating knob 149. The result is that when the knob 149 is rotated, the rollers 143 and 144 are rotated to move or feed the film web to the right, as viewed in Fig. 1, and downward along guide 145. An intermediate portion 150 of guide 145 is cut away and is covered with a transparent plate having a traverse opaque hairline 151 formed thereon. This hairline may be illuminated from beneath by lamps, shown in the wiring diagram, positioned in a housing 152. A mirror 153 may be vertically arranged back of the guide 145 to facilitate viewing of the hairline 151 by the operator, as illustrated in Fig. 3. The film web is moved downward along the guide 145 until a frame line 154 between transparencies is brought into registry with the hairline 151, as shown in Fig. 2. At that time, a button 155 on table top 53 is pressed and closes the circuit, as will be later described, to a notcher 156 which forms a notch 157 in an edge of the film strip opposite the image area, as shown in Fig. 27. As the notched film moves downward along guide 145, the notch finally registers with a spring-pressed finger 158 which normally rides on the edge of the film. However, upon such registration, the finger 158 moves into notch 157. Such movement initiates a cycle of operation and actuates the solenoid 311 which restrains the one-revolution clutch 63. As the solenoid 311 is energized it releases the clutch 63 which rotates shaft 56 one revolution. As the shaft 56 rotates, a cam 160 thereon, Fig. 16, rocks an arm 161 pivoted at 162 in a counterclockwise direction to move a braking portion 163 on the left end thereof, Fig. 16, into engagement with the film web on the guide 145 to hold the web against movement along the guide. A coil spring 164 and an adjusting screw 165 serve to hold arm 161 in engagement with the cam 160 and to assist in moving brake 163 against the film, as clearly illustrated in Fig. 6. At this time, a preceding notched film area has been moved off the lower end of guide 145 and over a plate 179 and overlies a mount which has been moved along tracks 131 and under the plate 179 which is positioned adjacent but below the lower end of the guide. This film area is so positioned that it is in registry with the opening 76 of the hollow frame 75. Another cam 166 on shaft 56 serves to rock a small heated tacker 167 which engages the positioned image area or transparency to tack or secure a small section of the area in position on its mount and in the hollow frame 75. The tacker 167 is carried by one end of an arm 168 pivoted at 169 to a bracket 170 supported by plate 52, see Fig. 13. The tacker has positioned therein a heater 171 and a thermostat 172, as shown in the wiring diagram to be later described. In order to protect the parts against breakage or damage in case some obstruction other than a mount and film comes in place under the tacker, the present invention provides a yieldable connection between the tacker and its cam 166. To this end the arm 168 carries an auxiliary arm 173 pivoted to arm 168 at 174. A free end of this auxiliary arm 173 carries a roller 175 which engages cam 166. A coil spring 176 carried by arm 168 serves to hold the roller 175 in yieldable engagement with cam 176. An adjusting screw 177 serves to adjust the tension of spring 176. As will be seen from an inspection of Fig. 13, the cam 166 has a long dwell portion 178 which serves to insure that the tacker 167 will be held against the film area for a sufficient period of time to permit the transmission of heat through the film and to the mount to insure the tacking of the area in position on the mount.

A knife or severing means 181 is positioned adjacent the right edge 179a of plate 179 and just ahead of the tacker 167, and cooperates with edge 179a to sever the positioned and tacked area from the web while the latter is held in position by the brake 163, as above described. The knife 181 is of the shape best shown in Fig. 14, and has one end secured by screws 182, or other suitable means, to an arm 183 pivoted at 184 to an upstanding bracket 185, see Fig. 2, carried by plate 51. The pivot 184 of the arm 183 extends through bracket 185 and carries a coil spring 186 positioned between adjusting nuts 187 and the washer 188 to hold the knife tightly yet yieldably in position. As in the case of the tacker, the knife is also yieldably connected to its operating cam 192 so as to prevent damage or breakage of parts in case some foreign obstruction comes in position under the knife. To secure this result, arm 183 has pivoted thereon at 189, an auxiliary arm 190 the free end of which is provided with a roller 191 which rides on the knife cam 192 carried by shaft 56. A coil spring 193 serves to hold the roller 191 in contact with the cam 192 while the tension of spring 193 is controlled by an adjusting screw 194 carried by arm 193, all as clearly illustrated in Fig. 14. Thus, the positioned film area is severed from the web while it is being tacked in place on the mount. The severed and tacked area and its mount then travel, as a unit, along tracks 131, as viewed in Fig. 1.

While the area or transparency is being positioned and tacked to the mount and also severed from the web, it is desirable to number the mount so that the mounted transparencies of a customer will be numbered consecutively. The extent of the numbers will, of course, depend upon the number of exposures in the strip belonging to the customer. As is well known, the number of exposures in a strip may vary and may be, for example, eight, twenty or thirty. After the mounts of one customer have been numbered successively, it is desirable to return the numbering device to its original or initial position, so that the next group of mounts, which may belong to the same or a different customer, may also be numbered consecutively. To this end, the present invention provides a numbering device which will number the mounts automatically and consecutively, and when the end of a strip is reached, the numbering device will be returned automatically to its initial or starting position.

Figure 24:
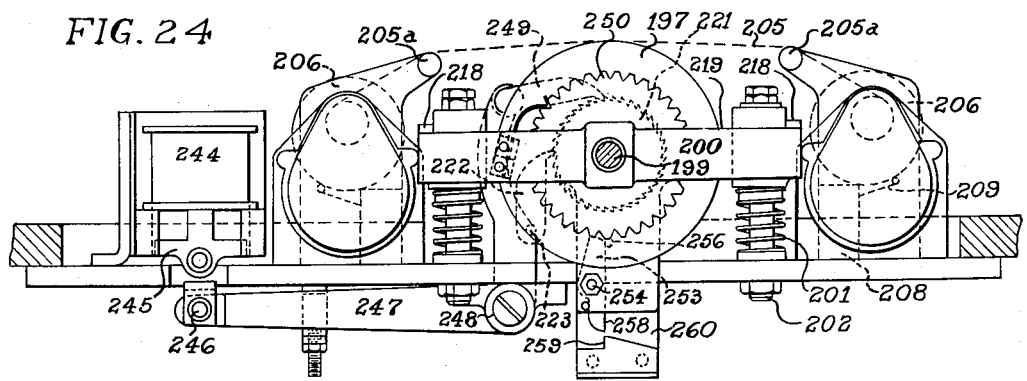
Fig. 24 is a side elevation view of the numbering mechanism, showing the relation of the parts.
Figure 25:
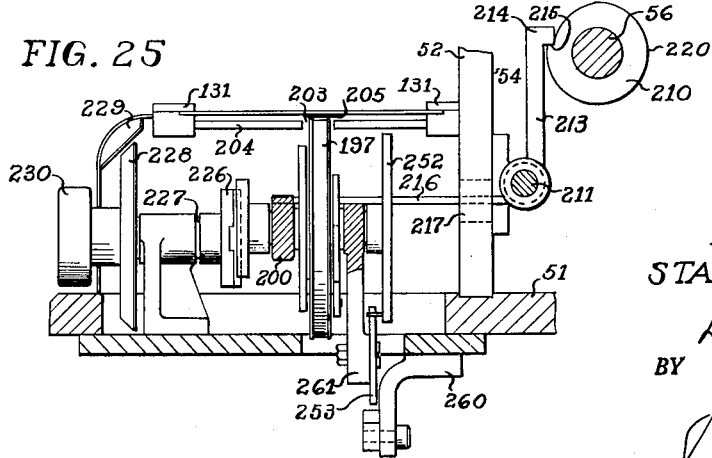
Fig. 25 is a vertical sectional view taken substantially on line 25—25 of Fig. 23, showing the relation of the control cam to the numbering mechanism.

The numbering device may comprise a numbering wheel 197 which is provided with numerals 198, as best shown in Fig. 23. The wheel is carried by a shaft 199 which is journaled in and supported by a cross-bar 200. The ends of the cross-bar are carried and supported by coil springs 201 positioned around studs 202 extending upwardly from the base 51, as best shown in Fig. 24. These springs 201 tend to shift or lift the bar 200 and the wheel 197 upward to move the wheel through an opening 203, Fig. 25, in the plate 204 connecting tracks 131, to position the wheel in a number applying position relative to the mount on the track, as illustrated in Fig. 25. An inking ribbon 205, similar to a typewriter ribbon, is positioned between the wheel and the mount so that when the wheel is raised, by springs 201, the positioned number will be applied to the bottom of the mount, as is apparent from an inspection of Fig. 25. The ends of the ribbon 205 are connected to reels 206 mounted on shafts 207 each of which is driven by a separate motor, indicated in the wire diagram to be later described. The ribbon, after leaving each reel 206, passes over an auxiliary guide roller 205a supported in any suitable manner on the machine frame. A microswitch 208 is associated with each reel motor and has an arm 209 which rests on the outer convolution of the ribbon on the reel 206. The switches 208 are arranged so that only one motor at a time is driven. However, when the supply of ribbon on one reel reaches a minimum, the motors are reversed so that the ribbon is driven in the opposite direction. As the ribbon movement and reversing is automatically controlled by the microswitches 208, no attention on the part of the operator is required.

In order to control the numbering in proper sequence and in timed relation to the tacking and severing operations, the upward movement of the numbering wheel 197 is controlled from a cam 210 positioned on shaft 56, and of the shape shown in Fig. 25. An auxiliary shaft 211 is arranged parallel to shaft 56, as shown in Fig. 23, and has the ends thereof supported in bearings 212 carried on a rear face 54 of plate 52, as best shown in Figs. 23 and 25. This auxiliary shaft 211 has secured thereto an upwardly extending arm 213 the end of which is formed with a pawl 214 adapted to engage a shoulder 215 formed on cam 210, as shown in Fig. 25. The shaft 211 also has secured thereto, adjacent bearings 212, the ends of a pair of cantilever arms 216 which extend through openings 217 in plate 52 and have the free ends 218 resting on the upper surfaces 219 of the cross-bar 200, as best shown in Figs. 23 and 24. When the shaft 56 is rotated, the pawl 214 will ride up on the surface 220 of the cam 210. Such arrangement will move pawl 214 to the left to impart a counterclockwise movement to shaft 211 to move the ends 218 of arms 216 downward to shift cross-bar 200 downward against the action of springs 201 to move the wheel 197 out of numbering relation with the mount. This downward movement of the wheel 197 and cross-bar 200 will bring ratchet wheel 221, carried by shaft 199, into engagement with a stationary pawl 222 pivoted at 223 on plate 51. Such engagement will serve to rotate the numbering wheel 197 one number. Thus, each rotation of shaft 56 will serve to move or index the numbering wheel 197. However, when the shaft 56 has completed one revolution, the cam 210 has reached the position shown in Fig. 25, and the arms 216, shaft 211, and arms 213 will rock clockwise under the action of springs 201 to move pawl 214 inward on cam 210 and behind shoulder 215. Such movement will render springs 201 effective to raise bar 200 and numbering wheel 197 to impress the next number on the mount. Thus, each mount is numbered, and the indexing of the wheel 197 is controlled by cam 210 on shaft 56.

In order that the operator may be apprised of the functioning of the wheel 197, the shaft 199, carrying the wheel, extends through the cross-bar 200 and is connected by a clutch 226, of any standard and suitable construction, to a shaft 227 on which is mounted an indicating dial 228 which is visible through an opening 229. The dial 228 carries numbers corresponding to those on the wheel 197, so the operator is always apprised of which number is to be applied to the mount. If desired, the shaft 227 may have mounted on an end thereof manual control knob 230 by which the operator may adjust, set, or reset the wheel 197, all as shown in Fig. 25.

At the end of each strip of image areas there is a trailing portion 231 which is connected by eyelets 140 to the leader portion 232 of the next strip, as shown in Fig. 27. When the last image area of the strip to the right of the eyelets 140 has been mounted and severed along line 233, it is desirable to remove the eyelets and sever the leader portion 232 along line 234. Such arrangement is preferably performed while the machine is not in operation. To secure this result, the present invention provides an L-shaped guard 235, best shown in Fig. 2, associated with a microswitch 236. When the last image area to the right of the eyelets 240 has been mounted and severed, the operator merely moves the guard 235 to the right to actuate switch 236, which serves to shut down the machine, as will be later explained. With the machine shut down, the operator turns knob 149 to move the web downward along guide 145 to bring line 234 under knife 181. The latter is then actuated independently of shaft 56 to sever the strip along line 234 by means of an auxiliary knife moving means which comprises in the present embodiment, an L-shaped lever 237 having one end 238 pivoted to the front of plate 51 and the free end 239 overlying end 240 of the knife 181, as best shown in Fig. 14. When the free end 239 is depressed, the knife 181 is rocked to sever the strip along line 234. When the strip has been severed along line 234, there then remains a section including the trailing portion 231 and the leader portion 232 connected by the eyelets 140, see Fig. 27. The portion 231 should go with the image area of the strip to the right of the eyelets, while the portion 232 should go with the image areas of the strip to the left of the eyelets.

Figure 28:
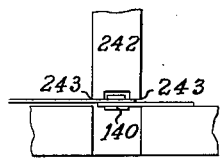
Fig. 28 is a vertical sectional view through the severing knife for removing the splice between the strips.

In order that the trailer and leader portions may be separated, the eyelet portion is removed by severing the strip along the two lines 241 on opposite sides of the eyelets. To this end, after the strip has been severed along the lines 233 and 234, the remaining strip is placed under a knife 242, Fig. 28, formed with a pair of cutting edges 243 spaced a distance equal to lines 241 to remove the eyelets and separate portions 231 and 232. The portion 231 is then dropped into a box, not shown, which contains the mounted image areas of the strip positioned to the right of the eyelets. On the other hand, the portion 232 is dropped into the next adjacent bin or box which is to receive the mounts containing the image areas of the strip to the left of the eyelets. These boxes, into which the finished mounts and the portions 231 and 233 are dropped, are carried by a conveyor, not shown. Thus, the trailer and leader portions are separated, and the eyelets removed, and the separate portions are then dropped into the proper box so as to be with the mounted image areas of the corresponding strips. After the spliced sections have been removed, the film web is moved backward or to the left along the guide 145 to position the first image area of the new strip for notching. However, after the eyelets have been removed and the trailer and leader portions separated, there still remains on the tracks 131 to the right of the severing means, four mounted transparencies which form a part of the strip to the right of the eyelet. Therefore, it is necessary to complete the folding and sealing of these four mounts before the conveyor is moved, so that all the mounts from one strip will be deposited in the same bin or box on the conveyor.

When the knife 242 is operated it actuates a microswitch, to be later described, which controls a pulsating solenoid 244. As the latter may be of any standard construction and does not form a part of the present invention, details thereof are not necessary. Suffice it to say, that when the solenoid 244 is energized it pulsates to move its armature 245 alternately up and down. The lower end of the armature 245 is pivotally connected at 246 to one end of a bellcrank 247 pivoted at 248. The other end of the bellcrank carries a pawl 249 which engages a second ratchet 250 carried by shaft 199. The result is that pulsations of the solenoid 244 cause bellcrank 247 to oscillate to move pawl 249 alternately into and out of engagement with ratchet 250 on shaft 199 to move wheel 197 progressively backward until the number "1" is in alignment with the opening 203 on the plate 204, and the number "1" on the dial 228 appears in the opening 229.

This return indexing of the wheel 197 occurs when the wheel is in its lowermost position. When, however, the wheel has been indexed back to its original or starting position, a protruding pin 251, see Fig. 23, carried by an auxiliary wheel 252 on shaft 199 engages the arm 253 of a microswitch 254 to open the circuit to the solenoid 244 to deenergize the latter to stop the bellcrank 247. It may be found, however, that the inertia of the wheel may tend to carry it beyond the initial point or past the numeral "1." Therefore, to insure positive stopping of the wheel at numeral "1," an auxiliary stopping means is provided. This auxiliary means is in the form of a lever 253 pivoted at 254 at its mid point, on a bracket 261 carried by and movable with shaft 199, as best shown in Fig. 25. The upper arm of lever 253 is positioned in the path of a second pin 256 projecting from the opposite side of wheel 252. It will be remembered that during this indexing of the wheel 197, the latter is in its lower position. In this position the lower arm of the lever 253 has formed on the right face thereof, as viewed in Fig. 24, a flat portion 258 which engages a flat shoulder 259 formed on a bracket 260 carried by plate 51. Thus, when the wheel 197 is reverse indexed, the pin 256 will engage the upper arm of lever 253; but as the lower arm of the latter is held against the movement by reason of shoulder 259, the pins 256, and hence the wheels 252 and 197, come to a stop with the numeral "1" in proper position. This pin 256 and lever 253 also permit the operator to return the wheel 197 manually to its starting position. As mentioned above, the wheel 197 is raised to apply the numeral to the mount. However, on the initial portion of its return movement, the pawl 222 will engage the ratchet wheel 221 to move the wheel 197 the distance of one numeral, as above described. Such movement will shift pin 256 out of alignment with the upper arm of lever 253.

As mentioned above, the operator moves the film web downward along guide 145 by rotating the hand wheel 149. When a frame line 154 between the image area has been moved into registry with the hairline 151, the operator presses button 53 to operate the notcher 156 to notch the film. However, when the notch finally moves into registry with the spring-pressed finger 158, the cycle is initiated, and a preceding image area which has been moved into accurate aligned relation with a mount positioned under the tacker 167 and knife 181 will be tacked and severed. It is apparent, however, that if the operator inadvertently presses the button 53 when the frame line 154 is not in exact registry with the hairline 151, the notch 157 will be improperly positioned relative to the picture area of the film. The result is that when the improperly positioned notch comes into registry with finger 158, the preceding image area will not be properly positioned relative to its mount on the tracks 131. Now, with the improperly positioned picture area, if the knife were operated, as above described, the knife may sever the image area along a line other than the frame line, and the image area may be ruined, as is deemed apparent. Of course, the amount of displacement of the cut depends on the degree of misplacement of the control notch. Therefore, in order to insure proper positioning of the film area before tacking and severing, the present invention provides an auxiliary control which operates in conjunction with finger 158. This auxiliary control and the finger 158 give a double control on the cycling of the machine so that the machine will not cycle until two conditions are satisfied: (1) the film area must be in proper position relative to the mount, and (2) the notch detecting finger must be in a notch. These two condiitons must occur simultaneously or the cycle will not start, the advantages of which are deemed apparent.

Figure 30:
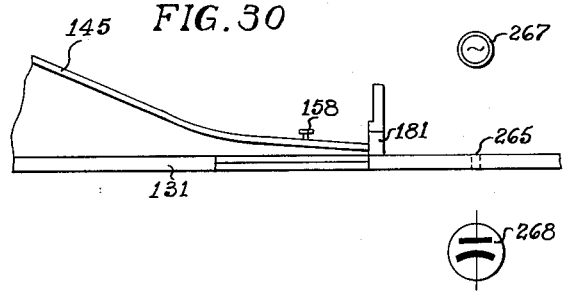
Fig. 30 is a front elevation view of the photoelectric cell and its exciter lamp, showing the relation thereof to the severing means.

To secure this auxiliary control, the plate 204 between tracks 131 just to the right of tacker 167, see Figs. 29 and 30, is formed with an elongated opening 265. This opening is positioned just to the left of the right edge 266 of the aperture 74 of flap 72 of the mount. The aperture 74 is the opening which frames the picture area of the transparency while the portion outside the picture area is supported on the flap 72 around the aperture 74 and in the opening 76 of the frame 75, as is deemed apparent. An exciter lamp 267 is positioned above and a photoelectric cell 268 is positioned below and in vertical alignment with opening 265, as clearly illustrated in Fig. 30. It will now be apparent from Figs. 29 and 30, that if the transparency is not properly positioned with respect to the mount, as shown in dotted lines, Fig. 29, the picture area of the transparency will not cover opening 265, and the photoelectric cell 268 will receive full illumination from the exciter lamp. In such case, the photoelectric cell will control electric circuits, to be later described, to prevent the starting of the cycle even though the finger 158 may be in notch 157 of the preceding film area. However, if the film area is in proper position relative to the mount, the picture area will overlie the opening 265 and will thus reduce the effect of the lamp 267 on the photoelectric cell 268 and the latter will then cooperate with finger 158 to start the cycle. Thus, it is necessary that both finger 158 be in the notch 157, and also that the preceding film area must be in proper position relative to the mount positioned under the tacker. The result is that if the area over the mount is not properly positioned, due to an improperly formed notch, the knife will not function to sever the film area. Such failure to function will draw the attention of the operator so that the condition may be corrected before the film area is damaged.

Now, the position has been reached at which a film area has been severed from the web, and the area properly positioned in the hollow frame 75 and relative to the aperture 74, and the positioned film has been attached or tacked in position on the mount. Also, the back of the mount has been numbered. Now, the mount with its attached and positioned area or transparency is moved along the tracks 131 by the moving mounts until the first mount approaches a folding and sealing means which first folds the mount along the line 70 to bring the flaps 71 and 72 into overlapping relation with the transparency sandwiched therebetween. The folded mount is then placed between a pair of heated jaws which apply heat to the mount to soften the frame 75 to adhere the frame to the flaps 71 to seal the mount to hold the flaps in assembled relation.

To secure this result the right end of the vertical plate 52 has secured thereto and extending forwardly therefrom, a pair of spaced side plates 270 to the front end of which are secured aligned spaced recessed plates 271 adapted to receive a vertically reciprocal slide plate 272. The edges of the plate 272 are covered with cover plates 273 which are secured to and cooperate with plates 271 to provide tracks or guides in which the edges of the plates 272 may move vertically. To the lower end of plate 272 is secured, by bolts or other fastening means, a folding blade 274 the bottom edge 275 of which is arranged in vertical alignment with the score line 70 of the mount. The plate 272 is formed with an aperture 276 in which is positioned a pair of spaced L-shaped plates 277, see Fig. 19, which support a pair of vertically spaced rollers 278 between which is positioned one end of an arm 279 of a bellcrank pivoted at 280 on the bracket 281 carried by plate 52, see Figs. 18 and 20. The other arm of the bellcrank carries a roller 282 which engages a cam 283 on shaft 56. A spring 305 serves to retain roller 282 in engagement with cam 283. Thus, when the shaft 56 is rotated, cam 283 imparts a vertical reciprocation to the folding plate 274. On the downward stroke of the latter, the folding edge 275 engages the mount along the line 70 and presses the mount into the space 284 between a pair of heated clamping jaws 285 and 286, which are in the position shown in Fig. 18, the jaw 285 being stationary. A plastic removable guard 304 covers the folding mechanism.

As the mount is pressed down between jaws 285 and 286 by folding blade 274, the mount engages the upper end of a lever 287 pivoted at 288 in a recess 289 formed in the jaw 285 and forces the upper end of the lever to the left, as viewed in Fig. 21, against action of a spring 290. When the mount has been moved downward a sufficient distance, the edge 291 of flap 72 engages behind a shoulder 292 on the pivoted lever 287 to retain the mount in position between the jaws when the folding blade is withdrawn or moved upward. A lug 293 on the lower end of lever 297 engages the bottom of the recess 289 to position the shoulder 292 to engage the edge 291 of the flap 72. Thus, the mount is positioned and held between the heated jaws 285 and 286. A set screw 294 may be used to position the stationary jaw 285 initially. In the present embodiment the jaws 285 and 286 preferably are heated electrically, but it is obvious that other suitable heating means may be used.

With the mount folded and positioned between the heated jaws 285 and 286, the latter is moved toward the stationary jaw or to the left as viewed in Figs. 17, 18, and 20, to move the jaw 286 to the position shown in Fig. 17 to cooperate with the stationary jaw 285 to clamp the folded mount therebetween. As the mount is so clamped, the adhesively coated frame 75 is heated sufficiently to cause the frame 75 also to adhere to the inner face of flap 71 to adhere the two flaps together to seal the mount and to retain the film area or transparency in position therein. In order to move the jaw 286, the latter has pivotally connected thereto at 295 one end of an arm 296 which is pivoted at 297 to another arm 298 pivoted at 299 to a bracket 300 carried by the machine frame as best shown in Fig. 20. When the jaws are in open position, as shown in Figs. 18 and 20, the arms 296 and 298 are bent out of alignment. A cam 301 on shaft 56 is adapted to engage the arms at point 297 and force the pivot point 297 downward. Such movement will serve to straighten out or align arms 296 and 298 to move jaw 286 towards jaw 285. The arms 296 and 298 thus provide a toggle member which serves to move the jaw 286 to and from cooperating relation with the jaw 285. A coil spring 302 carried by the machine frame has one end 303 connected to point 297 and serves to move the jaw 286 to released position and move the arms 296 and 298 to bent relation as the cam 301 rotates. Also, spring 302 serves to hold point 297 in positive contact with cam 301, so that the latter may be operative to move jaw 286, all as will be deemed apparent from an inspection of Fig. 20. As the jaw 286 is moved to the right or open position, the folded and sealed mount drops downward from between the jaws and into the proper bin on the conveyor. When all the image areas of a particular film strip have been mounted, folded, sealed and dropped in the proper bin in the conveyer, the latter moves forward the distance of one bin to position the next bin below the jaws 285 and 286 to receive the mounted images of the next strip. As mentioned above, this conveyor and the moving means therefor constitute no part of the present invention and are, therefore, not illustrated or described.

Figure 31:
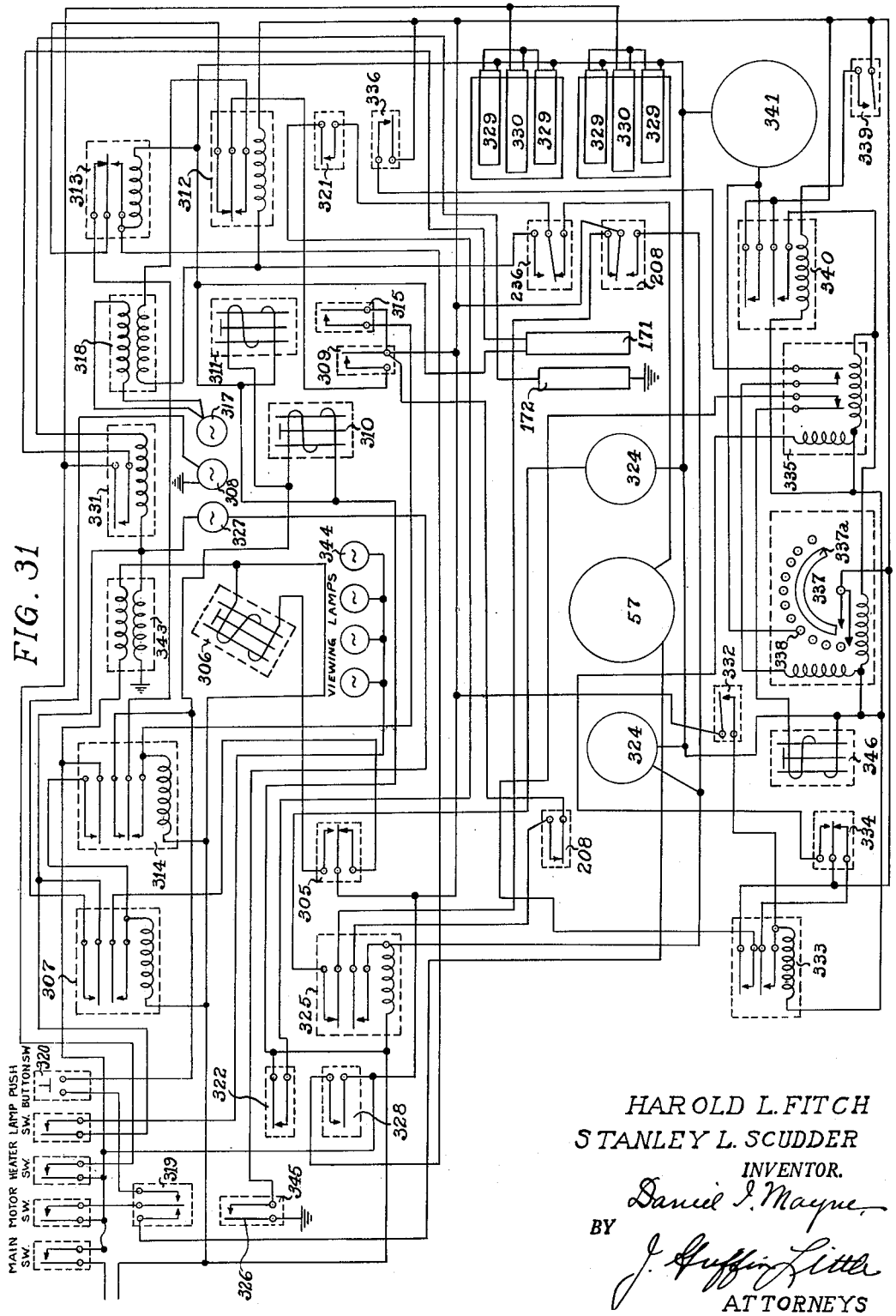
Fig. 31 is a view of the wiring diagram of the machine.

The wire diagram, Fig. 31, will now be described so as to point out the sequence of operation of the various parts described.

When the button 53 is pressed a microswitch 305 is closed and this switch actuates a solenoid 306 and deactuates a relay 307. The solenoid 306 operates the notcher 156. The relay 307 turns on a green lamp 308 mounted on plate 52 to indicate to the operator that the film has been notched. The operator then advances the film web downward along guide 145 by rotating knob 149 until finger 158 drops into notch 157. When the finger drops into the notch it operates a microswitch 309 and actuates solenoids 310 and 311, which receive power through contacts of relays 312, 313 and 314. Solenoid 310 actuates brake 163 which stops the film web on guide 145. Solenoid 310 releases the one revolution clutch 63 and allows the cam or main drive shaft 56 to make one revolution.

On shaft 56 there are several cams which control various members, for example, cam 301 closes and opens the sealing jaws or blocks, 283 controls the mount folding mechanism, cam 166 controls the tacker, cam 192 controls the knife, cam 210 controls the numbering mechanism, cam 160 controls the brake, cam 99 controls the plunger on the mount ejecting mechanism and places it in position on tracks 131, cam 96 controls the air valve on the plunger. In addition to controlling the knife, cam 192 also actuates and deactuates microswitch 315 which controls relay 314. The latter, in turn, controls the release of the brake solenoid 310 and the clutch solenoid 311. Relay 314 also controls actuation of relay 307 turning off the green light 308.

As shown in the wiring diagram, microswitch 236 has two contacts. In normal operation, when a notch in a film area comes into registry with finger 158, microswitch 309 is actuated; and through one side of microswitch controls solenoids 310 and 311. However, when the splice is to be removed and the film web has been moved to the proper position, above described, to remove the splice the operator slides the guard 235 to the right, and such movement adjusts microswitch 236 to disconnect solenoids 310 and 311 from microswitch 309. When the film web has been properly positioned, the finger 158 drops into the notch 157. Now, when the finger 158 drops into the notch an amber light 317 goes on and the circuit is completed through microswitches 309 and 236, transformer 318 to lamp 317, to indicate to the operator that the splice is in position to be cut out. Microswitch 319 is positioned adjacent handle 136 and breaks the circuit to the cam shaft drive motor 57 when the handle 136 is inserted, as is shown in Fig. 8 to turn the cam shaft 57 and the mount ejecting mechanism manually for maintenance. Push button switch 320 releases clutch solenoid 311 for maintenance only. Microswitches 321 and 322 are for safety only, and are used to break the current to the motor 57 when the guards are off. Microswitches 208 control the relay 326 and are actuated and deactuated by the inking ribbon 205. When the inking ribbon 205 fills one of the reels 206 the ribbon will actuate one of the microswitches 208 and actuate or deactuate relay 325 which will stop the motor on the filling reel and start the motor on the empty reel to reverse the movement of the ribbon. These ribbon motors are designated by the numerals 324 in the wiring diagram.

Microswitch 345 is positioned adjacent magazine 80 and has an arm 326 which extends into the magazine. When the supply of mounts is below the arm 326 the switch 345 is actuated to indicate that additional mounts should be placed in the magazine. The switch 345 closes the circuit to the red lamp 327 to draw the attention of the operator that an additional supply of mounts is necessary. The photoelectric cell 268 controls the photorelay 328 and sets off the circuit of the clutch relay solenoid 311. The cell 268 is mounted under the tracks 131, one mount ahead or to the right of knife 181, as shown in Figs. 29 and 30, so that the mount ahead of the knife will have to be in the right position before the machine can operate or clutch 63 can be released.

The heaters 329 in the sealing blocks or jaws 285 and 286 are controlled by thermostats 330 in the jaws with the heaters. Relay 331 controls the heater 171 and the tacker 167. A thermostat 172 in the block with the heater 171 controls the relay 331 which has a 6.3 volt coil, using one side of the machine as common. Microswitch 332 controls relay 333 and is actuated by the film strip when slid under knife 242 to cut the film on lines 241 to remove the splice between the strips. Relay 333 actuates solenoid 346 which actuates knife 242 to cut out the splice when the splice is positioned under knife 242 by the operator, as mentioned above. Microswitch 334 controls the locking circuit of relay 333 until solenoid 346 has been bottomed. At the bottom of the stroke of the solenoid 346, the latter actuates microswitch 334 which then opens the locking circuit to relay 333, and momentarily closes the circuit to latch coil relay 335 latching the latter. When the relay 335 is latched, the circuit is opened releasing solenoid 346 by contacts on relay 335. Microswitch 336 is actuated and deactuated by the sealing jaws 285 and 286. When the latching relay 335 is latched, it closes contacts to step coil 337ª of stepping relay 337. Each actuation of the microswitch 336 will step relay 337 up one contact until the fourth contact 338 is closed. At that time the conveyor motor 341, not shown, will start by means of power received from the contact of stepping relay 337. The microswitch 339 is actuated by the mount receiving bins on the conveyor belt. The moving conveyor belt will actuate microswitch 339, and the latter will actuate relay 340. The latter is held actuated until microswitch 339 is actuated by the arrival of the next mount bin on the conveyor belt below the heating jaws. Relay 340 then unlatches the relay 335 and resets the stepping coil 337 and keeps the conveyor belt circuit closed to the conveyor belt drive motor 341 until the arrival of the next bin into position. Transformer 343 supplies 6.3 volt current to lamps 344 to enable the operator to view the film on guide 145 to locate the proper place to notch the edge of the film. This transformer 343 also supplied 6.3 volt current to the red lamp 327 which indicates when the supply of mounts is low in the magazine. In addition, transformer 343 supplies a 6.3 volt current to relay 331, actuating coil which is controlled by the thermostat in the tacker to keep the tacker at a set temperature.

It will be apparent from the above description that the present invention provides an automatic machine for mounting film areas or transparencies on a suitable mount of cardboard or similar material. The machine requires the minimum of care or supervision on the part of the operator. After the notched film actuates the spring-pressed finger, the parts operate automatically and in a definite timed sequence to eject the mount from the magazine, feed the mount along the tracks, tack the film area on the mount, sever the tacked area from the web, number, fold and seal the mount. The entire operation takes place without the operator touching either the film or mounts. Certain safety features are incorporated in the machine as a protection to the operator.

While one embodiment of the invention has been disclosed, it is to be understood that the inventive idea may be carried out in a number of ways. This application is, therefore, not to be limited to the precise details described, but is intended to cover all variations and modifications thereof which fall within the scope of the appended claims.

We claim:

1. A device for mounting transparencies which are arranged in connected relation in a web, comprising, in combination, means for feeding the web, means for severing individual transparencies from said web, means including means on said web for controlling said severing means, means to move mounts selectively under said severing means to receive the severed transparencies, and heating means applied to the severed transparency for securing a severed transparency to a mount.

2. A device for mounting transparencies which are arranged in connected relation in a web, comprising, in combination, a guide, means for moving said web along and positioning the web in a definite relation to said guide, means for forming a control notch in an edge of said web in a definite relation to a transparency, means to sever the transparencies progressively from said web, power means for actuating said severing means, means cooperating with said notch to control the operation of said severing means in timed relation to the movement of said web along said guide, means for moving mounts progressively to a position adjacent said severing means to receive the severed transparency, and heating means applied to a small area only of said severed transparency to adhere said area only of the severed transparencies in a definite position on said mounts.

3. A device for mounting transparencies which are arranged in connected relation in a web, comprising, in combination, means for feeding said web, means for severing the individual transparencies from said web, means on said web for controlling said severing means, and auxiliary control means cooperating with said first control means to prevent the operation of said severing means unless the transparency is in a definite position relative thereto.

4. A device for mounting transparencies which are arranged in connected relation in a web, comprising, in combination, means for feeding said web, means for severing the individual transparencies from said web, means on said web for controlling said severing means, auxiliary control means cooperating with said first control means to prevent the operation of said severing means unless the transparency is in a definite position relative thereto, means for moving mounts progressively to a definite position under said severing means so that the severed transparencies will be received by and will be positioned in a definite relation to said mounts, and means for applying heat to a small area of each transparency for securing of each transparency to a mount to maintain the position of the transparency on the mount.

5. A device for mounting transparencies which are arranged in connected relation in a web, comprising, in combination, a guide, means for moving said web along and positioning the web in a definite relation to said guide, means for forming a control notch on an edge of said web in a definite relation to a transparency, means to sever the transparencies progressively from said web, a control shaft, a cam on said shaft connected to said severing means for actuating the latter, means engageable in said notch to control said shaft to actuate said severing means in timed relation to the movement of said web along said guide, tracks positioned below said severing means, means to move mounts along said tracks and under said severing means to receive the severed transparencies, and auxiliary control means arranged in a definite relation to said severing means and the mount positioned thereunder and cooperating with said first control means to prevent the operation of said shaft until the transparency has been positioned in a definite relation to said severing means and said control member to prevent improper severing of said transparency.

6. A device for mounting transparencies which are arranged in connected relation in a web, comprising, in combination, a guide, means for moving said web along and positioning the web in a definite relation to said guide, means for forming a control notch on an edge of said web in a definite relation to a transparency, means to sever the transparencies progressively from said web, a control shaft, a cam on said shaft connected to said severing means for actuating the latter, means engageable in said notch to control said shaft to actuate said severing means in timed relation to the movement of said web along said guide, tracks positioned below said severing means, means to move mounts along said tracks and under said severing means to receive the severed transparencies, auxiliary control means arranged in a definite relation to said severing means and the mount arranged thereunder and cooperating with said first control means to prevent the operation of said shaft until the transparency has been positioned in a definite relation to said severing means and said control member to prevent improper severing of said transparency, a heater tacker positioned adjacent said severing means and above said mount and movable into engagement with the severed transparency positioned on said mount to heat-tack a small area of said transparency to said mount to maintain the positioning of said transparency, and a second cam on said shaft for controlling the operation of said tacker in timed relation to said severing means and the movement of said web along said guide.

7. A device for mounting transparencies which are arranged in connected relation in a web, comprising, in combination, means for feeding said web, means for severing individual transparencies from said web, means including means on said web for controlling said severing means, means to move mounts progressively into position to receive the severed transparencies, means for securing each transparency to one side of each mount, means to apply a number to the other side of each mount, said number applying means comprising a rotatable numbering wheel, a support for said wheel, means for yieldably mounting said support for moving said wheel toward said mount to apply a number thereto, means for moving said wheel away from said mount, and means for indexing said wheel automatically.

8. A device for mounting transparencies which are arranged in connected relation in a web, comprising, in combination, means for feeding said web, means for severing individual transparencies from said web, means including means on said web for controlling said severing means, means to move mounts progressively into position to receive the severed transparencies, means for securing each transparency to one side of each mount, means for applying numbers to said mounts, said number applying means comprising a rotatable numbering wheel, a support for said wheel, means for yieldably mounting said support for moving said wheel toward said mount to apply a number on each mount, means for indexing said wheel automatically when said wheel is moved away from said mount, and means for resetting said wheel.

9. A device for mounting transparencies arranged in strips which are spliced together to form a web, comprising, in combination, means for feeding the web, means for severing individual transparencies from the web, means including means formed on said web in definite relations to said transparencies to control the positions of severance of said web by said severing means, means for positioning mounts adjacent said severing means to receive and position the severed transparencies thereon, means to apply a number to said each mount when said transparency is positioned on said mount, means for indexing said numbering means, means to remove the splice between said strips, and means controlled by the splice removing means to reset said numbering means.

10. A device for mounting transparencies arranged in strips which are spliced together to form a web, comprising, in combination, means for feeding the web, means for severing individual transparencies from the web, means on said web for controlling said severing means, means including means formed on said web in definite relations to said transparencies to control the positions of severance of said web by said severing means, means including mount supporting tracks for positioning mounts adjacent said severing means to receive and position the severed transparencies thereon, auxiliary control means associated with said tracks and cooperating with said first control means to prevent the operation of said severing means when a transparency to be severed is not in a definite relation to the mount positioned to receive the transparencies, means to apply a number to each mount when said transparency is positioned on said mount, means for indexing said numbering means, means to remove the splice between said strips, and means controlled by the splice removing means to reset said numbering means.

11. A device for mounting transparencies arranged in strips which are spliced together to form a web, comprising, in combination, means for feeding the web, means for severing individual transparencies from the web, means including means formed on said web in definite relations to said transparencies to control the positions of severance of said web by said severing means, means for positioning mounts adjacent said severing means to receive and position the severed transparencies thereon, means to heat-tack a small area of the severed transparencies on said receiving mounts, a control shaft, cams on said shaft for actuating said severing and tacking means, and means for controlling said shaft from said first control means.

12. A device for mounting transparencies arranged in strips which are spliced together to form a web, comprising, in combination, means for feeding the web, means for severing individual transparencies from the web, means including means formed on said web in definite relations to said transparencies to control the positions of severance of said web by said severing means, means for positioning mounts adjacent said severing means to receive and position the severed transparencies thereon, means to heat-tack a small area of the severed transparencies on said receiving mounts, a control shaft, cams on said shaft for actuating said severing and tacking means, means for controlling said shaft from said first control means, means to apply a number to said each mount when said transparency is positioned on said mount, means for indexing said numbering means, means to remove the splice between said strips, and means controlled by the splice removing means to reset said numbering means.

13. A machine for mounting transparencies arranged in connected relation in a web comprising, in combination, a guide and supporting track, means for depositing unfolded mounts on said track, means for moving the unfolded mounts along said track, means for moving the web, means for forming a control portion on said web in a definite relation to each transparency, means for severing said transparencies individually from said web, means to position the severed transparency on the unfolded mounts, means to fold each mount with its transparency positioned thereon, means to seal the mount, and means actuated by said control portion for controlling certain of said means in a definite timed relation.

14. A machine for mounting transparencies arranged in connected relation in a web comprising, in combination, a guide and supporting track, means for depositing unfolded mounts on said track, means for moving the unfolded mounts along said track, means for moving said web, means for forming a control portion on said web in a definite relation to each transparency, means for severing said transparencies individually from said web, means to position each severed transparency on an unfolded mount, means to secure each transparency in position on an unfolded mount, means to fold the mount to position the transparency therein, means to seal the folded mount, and means actuated by said control portion for controlling certain of said means in a definite timed sequence.

15. A machine for mounting transparencies arranged in connected relation in a web comprising, in combination, a guide and supporting track, means for depositing unfolded mounts on said track, means for moving the unfolded mounts along said track, means for moving said web, means for forming a control portion on said web in a definite relation to each transparency, means for severing said transparencies individually from said web, means to position the severed transparency on an unfolded mount, means to secure each transparency in position on an unfolded mount, means to fold the mount to retain the transparency therein, means to seal the folded mount, means actuated by said control portion for controlling certain of said means in a definite time sequence, and means cooperating with said control means to prevent actuation of said certain means when a severed transparency is not arranged in proper relation on a mount.

16. A machine for mounting transparencies arranged in connected relation in a web comprising, in combination, a guide and supporting track, means for depositing unfolded mounts on said track, means for moving the unfolded mounts along said track, means for moving a said web, means for forming a control portion on said web in a definite relation to each transparency, means for severing said transparencies individually from said web, means to position the severed transparency on an unfolded mount, means to secure each transparency in position on an unfolded mount, means to fold the mount to retain the transparency therein, means to seal the folded mount, means actuated by said control portion for controlling certain of said means in a definite time sequence, and means operatively connected to said control means to prevent the actuation of said severing means when a control portion is improperly positioned relative to a transparency.

17. A machine for mounting transparencies arranged in connected relation in a web comprising, in combination, a guide and supporting track, means for depositing unfolded mounts on said track, means for moving the unfolded mounts along said track, means for moving said web, means for forming a control portion on said web in a definite relation to each transparency, means for severing said transparencies individually from said web, means to position the severed transparency on an unfolded mount, means to fold the mount with its transparency positioned therein, means to seal the mount, control means cooperating with said control portion to control the actuation of certain of said means, and means cooperating with said control means to prevent the operation of said severing means when said control portion is not in said definite relation to prevent improper severing of the transparency from said web.

18. A machine for mounting transparencies arranged in connected relation in a web comprising, in combination, a guide and supporting track, means for depositing unfolded mounts on said track, means for moving the unfolded mounts along said track, means for severing a transparency from said web, means to position the severed transparency on an unfolded mount, means to secure said severed transparency to said mount, means to number the mount, means to fold the mount with the transparency therein, and means to seal the folded mount.

19. A machine for mounting transparencies arranged in connected relation in a web comprising, in combination, a guide and supporting track, means for depositing unfolded mounts on said track, means for moving the unfolded mounts along said track, means for moving said web, means for forming a control portion on said web in a definite relation to each transparency, means for severing said transparencies individually from said web, means to position each severed transparency on an unfolded mount, means to apply a number to said mount, means to fold the mount with its transparency positioned therein, means to seal the mount, and means actuated by said control portion for controlling certain of said means in a definite timed relation.

20. A machine for mounting transparencies arranged in connected relation in a web comprising, in combination, a guide and supporting track, means for depositing unfolded mounts on said track, means for moving the unfolded mounts along said track, means for severing a transparency from said web, means to position the severed transparency on an unfolded mount, means to secure said severed transparency to said mount, means to fold the mount, means to seal the folded mount, a control shaft, means on said shaft for actuating said means, and means on said web for controlling the operation of said shaft.

21. A machine for mounting transparencies arranged in connected relation in a web comprising, in combination, a guide and supporting track, means for depositing unfolded mounts on said track, means for moving the unfolded mounts along said track, means for moving said web, means for forming a control portion on said web in a definite relation to each transparency, means for severing said transparencies individually from said web, means to position each severed transparency on an unfolded mount, means to fold each mount with its transparency positioned therein, means to seal the mount, a control shaft, cams on said shaft for controlling said means, means for operating said shaft, and means actuated by said control portion for controlling said shaft operating means.

22. A machine for mounting transparencies arranged in connected relation in a web comprising, in combination, a guide and supporting track, means for depositing unfolded mounts on said track, means for moving the unfolded mounts along said track, means for moving said web, means for forming a control portion on said web in a definite relation to each transparency, means for severing said transparencies individually from said web, means to position each severed transparency on an unfolded mount, means to fold each mount with its transparency positioned therein, means to seal each mount, a control shaft, cams on said shaft for controlling said means, means for operating said shaft, means actuated by said control portion for controlling said shaft operating means, and auxiliary control means operatively connected to said shaft control means and cooperating with the means actuated by said control portion to prevent operation of said shaft operating means when an improperly positioned control portion is in operative relation with the means actuated by the control portion to prevent improper severing of a transparency.

23. A machine for mounting transparencies arranged in connected relation in a web comprising, in combination, a guide and supporting track, means for depositing unfolded mounts on said track, means for moving the unfolded mounts along said track, means for moving said web, means for forming a control notch in an edge of the web in a definite relation to each transparency, means for severing the web between transparencies to separate a transparency from the web, means to position the severed transparency accurately on a mount, a means to secure a small portion of said positioned transparency to its mount, means to number the mount, means to secure a small portion of said positioned therein, means to seal the folded mount, a control shaft, an electric drive motor, means to connect said motor to said shaft to rotate the latter, cams on said shaft for actuating certain of said means, and a spring pressed finger movable into said notch to control said connecting means to connect the motor to the shaft to actuate said means in proper timed sequence.

24. A device for mounting transparencies which are arranged in connected relation in a web comprising, in combination, a guide along which said web is moved, means for severing individual transparencies from said web, visual indicating means on said guide cooperating with said web for positioning said transparencies in a definite relation to said severing means, means controlled by said web for actuating said severing means, means to move mounts selectively under said severing means to position said mounts to receive the severed transparencies, and means for securing the severed transparencies selectively to said mounts.

25. A device for mounting transparencies which are arranged in connected relation in a web comprising, in combination, a guide along which said web is moved, means to move said web along said guide, means to sever said transparencies individually from said web, means on said guide cooperating with said web to position each transparency selectively in a definite relation to said severing means, means to position mounts to receive the severed transparencies, auxiliary means cooperating with and controlled by a transparency to be severed to control the operation of said severing means, and means to attach each severed transparency to a mount.

References Cited in the file of this patent

UNITED STATES PATENTS

| Number | Name | Date |
|---|---|---|
| 1,090,388 | Foote | Mar. 17, 1914 |
| 1,543,822 | Bronander | June 30, 1925 |
| 1,598,957 | Chamberlin | Sept. 7, 1926 |
| 1,716,523 | Hopkins | June 11, 1929 |
| 1,813,869 | Templeton et al. | July 7, 1931 |
| 1,832,501 | Pittenger et al. | Nov. 17, 1931 |
| 2,054,167 | Reynolds et al. | Sept. 15, 1936 |
| 2,176,815 | Hirohaski | Oct. 17, 1939 |
| 2,228,162 | Benham et al. | Jan. 7, 1941 |
| 2,262,798 | Elliot | Nov. 18, 1941 |
| 2,276,854 | Margodant | Mar. 17, 1942 |
| 2,286,159 | Reynolds | June 9, 1942 |
| 2,286,686 | Muddiman | June 16, 1942 |
| 2,302,561 | Libby et al. | Nov. 17, 1942 |
| 2,322,298 | Johnson | June 22, 1943 |
| 2,329,669 | Tuthill | Sept. 14, 1943 |
| 2,358,742 | Sickles | Sept. 19, 1944 |
| 2,365,288 | Pask | Dec. 19, 1944 |
| 2,378,306 | Leonhart | June 12, 1945 |
| 2,465,453 | Holbrook | Mar. 29, 1949 |
| 2,555,218 | Bailey | May 29, 1951 |
| 2,588,087 | Connor et al. | Mar. 4, 1952 |

FOREIGN PATENTS

| Number | Country | Date |
|---|---|---|
| 409,749 | Germany | Feb. 10, 1925 |
| 644,119 | Great Britain | Oct. 4, 1950 |